United States Patent [19]
Rutkowski et al.

[11] Patent Number: 5,445,769
[45] Date of Patent: Aug. 29, 1995

[54] SPINNER HEAD FOR FLASH FLOW PROCESSING

[75] Inventors: William F. Rutkowski, Arlington; Garry L. Myers, Reston; B. Arlie Bogue, Broad Run, all of Va.

[73] Assignee: Fuisz Technologies Ltd., Chantilly, Va.

[21] Appl. No.: 266,234

[22] Filed: Jun. 27, 1994

[51] Int. Cl.$^6$ .............................................. B29C 67/00
[52] U.S. Cl. ............................................. 264/8; 425/8; 425/9
[58] Field of Search ............................ 264/8; 425/8, 9

[56] References Cited

U.S. PATENT DOCUMENTS

| | | |
|---|---|---|
| Re. 32,016 | 10/1985 | Esders et al. . |
| 856,424 | 6/1907 | Robinson . |
| 1,489,342 | 4/1924 | Brent . |
| 1,541,378 | 6/1925 | Parcell . |
| 2,826,169 | 3/1958 | Le Veen . |
| 2,918,404 | 12/1959 | Mende et al. . |
| 3,019,745 | 2/1962 | Du Bois et al. . |
| 3,036,532 | 5/1962 | Bowe . |
| 3,067,743 | 12/1962 | Merton et al. . |
| 3,070,045 | 12/1962 | Bowe . |
| 3,073,262 | 1/1963 | Bowe . |
| 3,095,258 | 6/1963 | Scott . |
| 3,118,396 | 1/1964 | Brown et al. . |
| 3,118,397 | 1/1964 | Brown et al. . |
| 3,125,967 | 3/1964 | Bowe . |
| 3,131,428 | 5/1964 | Mika . |
| 3,308,221 | 3/1967 | Opfell . |
| 3,324,061 | 6/1967 | Tanquary et al. . |
| 3,482,998 | 12/1969 | Carroll et al. . |
| 3,523,889 | 8/1970 | Eis . |
| 3,557,717 | 1/1971 | Chivers . |
| 3,595,675 | 7/1971 | Ash et al. . |
| 3,615,671 | 10/1971 | Schoaf . |
| 3,625,214 | 12/1971 | Higuchi . |
| 3,676,148 | 7/1972 | De Weese et al. . |
| 3,723,134 | 3/1973 | Chivers . |
| 3,749,671 | 7/1973 | Gedge et al. . |
| 3,762,846 | 10/1973 | Chivers . |
| 3,766,165 | 10/1973 | Rennhard . |
| 3,856,443 | 12/1974 | Salvi . |
| 3,875,300 | 4/1975 | Homm et al. . |
| 3,876,794 | 4/1975 | Rennhard . |
| 3,907,644 | 9/1975 | Möllering et al. . |
| 3,912,588 | 10/1975 | Möllering et al. . |
| 3,925,164 | 9/1975 | Beaucamp et al. . |
| 3,925,525 | 12/1975 | LaNieve . |
| 3,930,043 | 12/1975 | Warning et al. . |

(List continued on next page.)

FOREIGN PATENT DOCUMENTS

| | | |
|---|---|---|
| 609135 | 4/1988 | Australia . |
| 609137 | 4/1988 | Australia . |
| 900605 | 11/1977 | Belgium . |

(List continued on next page.)

OTHER PUBLICATIONS

R. H. Doremus, "Crystallization of Sucrose From Aqueous Solution," *Journal of Colloid and Interface Science*, 104, pp. 114–120 (1985).

(List continued on next page.)

*Primary Examiner*—Mary Lynn Theisen
*Attorney, Agent, or Firm*—Hoffmann & Baron

[57] ABSTRACT

A spinner head for flash flow processing includes a closed base and a top having an opening for introducing feedstock and a substantially cylindrical wall extending between the base and top forming a chamber. The substantially cylindrical wall has an inner and an outer surface, the outer surface provided with relief formed to accommodate fixation of a heating element for the uniform supply of surface heat to the inner surface. The wall also includes a plurality of openings extending from the inner to outer surface, each of which forming a substantially non-tortuous path for passage of product therethrough.

21 Claims, 7 Drawing Sheets

U.S. PATENT DOCUMENTS

| | | |
|---|---|---|
| 3,951,821 | 4/1976 | Davidson . |
| 3,967,623 | 7/1976 | Butterworth et al. . |
| 3,972,725 | 8/1976 | Nicol . |
| 3,981,739 | 9/1976 | Dmitrovsky et al. . |
| 3,992,265 | 11/1976 | Hansen . |
| 4,056,364 | 11/1977 | Dmitrovsky et al. . |
| 4,072,658 | 2/1978 | Okamoto et al. . |
| 4,086,418 | 4/1978 | Turbak et al. . |
| 4,090,920 | 5/1978 | Studer, Jr. . |
| 4,136,145 | 1/1979 | Fuchs et al. . |
| 4,153,512 | 5/1979 | Messner et al. . |
| 4,159,210 | 6/1979 | Chen et al. . |
| 4,160,696 | 7/1979 | Wu . |
| 4,164,448 | 8/1979 | Röeschlau et al. . |
| 4,168,205 | 9/1979 | Danninger et al. . |
| 4,186,251 | 1/1980 | Tarbutton . |
| 4,194,063 | 3/1980 | Frank et al. . |
| 4,199,373 | 4/1980 | Dwivedi . |
| 4,241,178 | 12/1980 | Esders et al. . |
| 4,271,199 | 6/1981 | Cherukuri et al. . |
| 4,293,292 | 10/1981 | Israel . |
| 4,293,570 | 10/1981 | Vadasz . |
| 4,303,684 | 12/1981 | Pitchon et al. . |
| 4,335,232 | 6/1982 | Irwin . |
| 4,338,350 | 7/1982 | Chen et al. . |
| 4,348,420 | 9/1982 | Lynch et al. . |
| 4,362,757 | 12/1982 | Chen et al. . |
| 4,371,516 | 2/1983 | Gregory et al. . |
| 4,376,743 | 3/1983 | Dees . |
| 4,382,963 | 5/1983 | Klose et al. . |
| 4,382,967 | 5/1983 | Koshida . |
| 4,492,685 | 1/1985 | Keith et al. . |
| 4,496,592 | 1/1985 | Kuwahara et al. . |
| 4,500,546 | 2/1985 | Turbak et al. . |
| 4,511,584 | 4/1985 | Percel et al. . |
| 4,526,525 | 7/1985 | Oiso et al. . |
| 4,581,234 | 4/1986 | Cherukuri et al. . |
| 4,585,797 | 4/1986 | Cioca . |
| 4,619,833 | 10/1986 | Anderson . |
| 4,722,845 | 2/1988 | Cherukuri et al. . |
| 4,747,881 | 5/1988 | Shaw et al. . |
| 4,765,991 | 8/1988 | Cherukuri et al. . |
| 4,772,477 | 9/1988 | Weiss et al. . |
| 4,793,782 | 12/1988 | Sullivan . |
| 4,797,288 | 1/1989 | Sharma et al. . |
| 4,816,283 | 3/1989 | Wade et al. . |
| 4,839,184 | 6/1989 | Cherukuri et al. . |
| 4,846,643 | 7/1989 | Yamamoto et al. . |
| 4,853,243 | 8/1989 | Kahn et al. . |
| 4,855,326 | 8/1989 | Fuisz . |
| 4,871,501 | 10/1989 | Sugimoto et al. . |
| 4,872,821 | 10/1989 | Weiss . |
| 4,879,108 | 11/1989 | Yang et al. . |
| 4,885,281 | 12/1989 | Hanstein et al. . |
| 4,900,563 | 2/1990 | Cherukuri et al. . |
| 4,931,293 | 6/1990 | Cherukuri et al. . |
| 4,978,537 | 12/1990 | Song . |
| 4,981,698 | 1/1991 | Cherukuri et al. . |
| 4,988,529 | 1/1991 | Nakaya et al. . |
| 4,997,856 | 5/1991 | Fuisz . |
| 5,009,893 | 4/1991 | Cherukuri et al. . |
| 5,011,532 | 4/1991 | Fuisz . |
| 5,028,632 | 7/1991 | Fuisz . |
| 5,034,421 | 7/1991 | Fuisz . |
| 5,037,662 | 8/1991 | Poulose et al. . |
| 5,039,446 | 8/1991 | Estell . |
| 5,041,377 | 8/1991 | Becker et al. . |
| 5,057,328 | 10/1991 | Cherukuri et al. . |
| 5,066,218 | 11/1991 | Silver . |
| 5,073,387 | 12/1991 | Whistler . |
| 5,077,076 | 12/1991 | Gonsalves et al. . |
| 5,082,682 | 1/1992 | Peterson . |
| 5,082,684 | 1/1992 | Fung . |
| 5,084,295 | 1/1992 | Whelan et al. . |
| 5,089,606 | 2/1992 | Cole et al. . |
| 5,094,872 | 3/1992 | Furcsik et al. . |
| 5,096,492 | 3/1992 | Fuisz . |
| 5,104,674 | 4/1992 | Chen et al. . |
| 5,110,614 | 5/1992 | Corbin et al. . |
| 5,164,210 | 11/1992 | Campbell et al. . |
| 5,169,657 | 12/1992 | Yatka et al. . |
| 5,169,658 | 12/1992 | Yatka et al. . |
| 5,171,589 | 12/1992 | Richey et al. . |
| 5,173,317 | 12/1992 | Hartman et al. . |
| 5,173,322 | 12/1992 | Melachouris et al. . |
| 5,175,009 | 12/1992 | Synosky et al. . |
| 5,196,199 | 3/1993 | Fuisz . |
| 5,238,696 | 8/1993 | Fuisz . |
| 5,279,849 | 1/1994 | Fuisz et al. . |
| 5,284,659 | 2/1994 | Cherukuri et al. . |
| 5,286,513 | 2/1994 | Fuisz . |
| 5,288,508 | 2/1994 | Fuisz . |
| 5,312,469 | 5/1994 | Houston ................................. 65/6 |
| 5,346,377 | 9/1994 | Bogue et al. ............................ 425/9 |

FOREIGN PATENT DOCUMENTS

| | | |
|---|---|---|
| 1303511 | 4/1988 | Canada . |
| 0287488A1 | 3/1988 | European Pat. Off. . |
| 0387690A1 | 8/1990 | European Pat. Off. . |
| 86052 | 4/1988 | Israel . |
| 86053 | 4/1988 | Israel . |
| 88/2770 | 4/1988 | South Africa . |
| 88/2771 | 4/1988 | South Africa . |
| 89/9318 | 12/1989 | South Africa . |
| 90/2139 | 3/1990 | South Africa . |
| 90/8406 | 8/1991 | South Africa . |
| 519858 | 5/1971 | Switzerland . |
| 489211 | 7/1986 | Switzerland . |
| 2155934 | 3/1985 | United Kingdom . |
| WO91/18613 | 5/1991 | WIPO . |

OTHER PUBLICATIONS

P. Bennema, "Surface Diffusion and the Growth of Sucrose Crystals," *Journal of Crystal Growth*, 3, 4 pp. 331–334 (1968).

T. D. Simpson, et al., "Crystalline Forms of Lactose Produced in Acidic Alcoholic Media," *Journal of Food Science*, 47, pp. 1948–1954 (1982).

A. D. Randolph, et al., "Continuous Sucrose Nucleation," *The International Sugar Journal*, pp. 8–12 (1974).

K. B. Domovs, et al., "Methanol–Soluble Complexes of Lactose and of other Carbohydrates," *J. Dairy Science*, 43, pp. 1216–1223 (1960).

A. D. Randolph, et al., "Continuous Sucrose Nucleation," *The International Sugar Journal*, pp. 35–38, 73–77 (1974).

ICI Americas, Inc., "ICI Americas Products for Cosmetics and Pharmaceuticals," (1977).

Domino Sugar Corporation, "Co–crystallization".

Domino Sugar Corporation, "Raspberry".

Domino Sugar Corporation, "Molasses Dark".

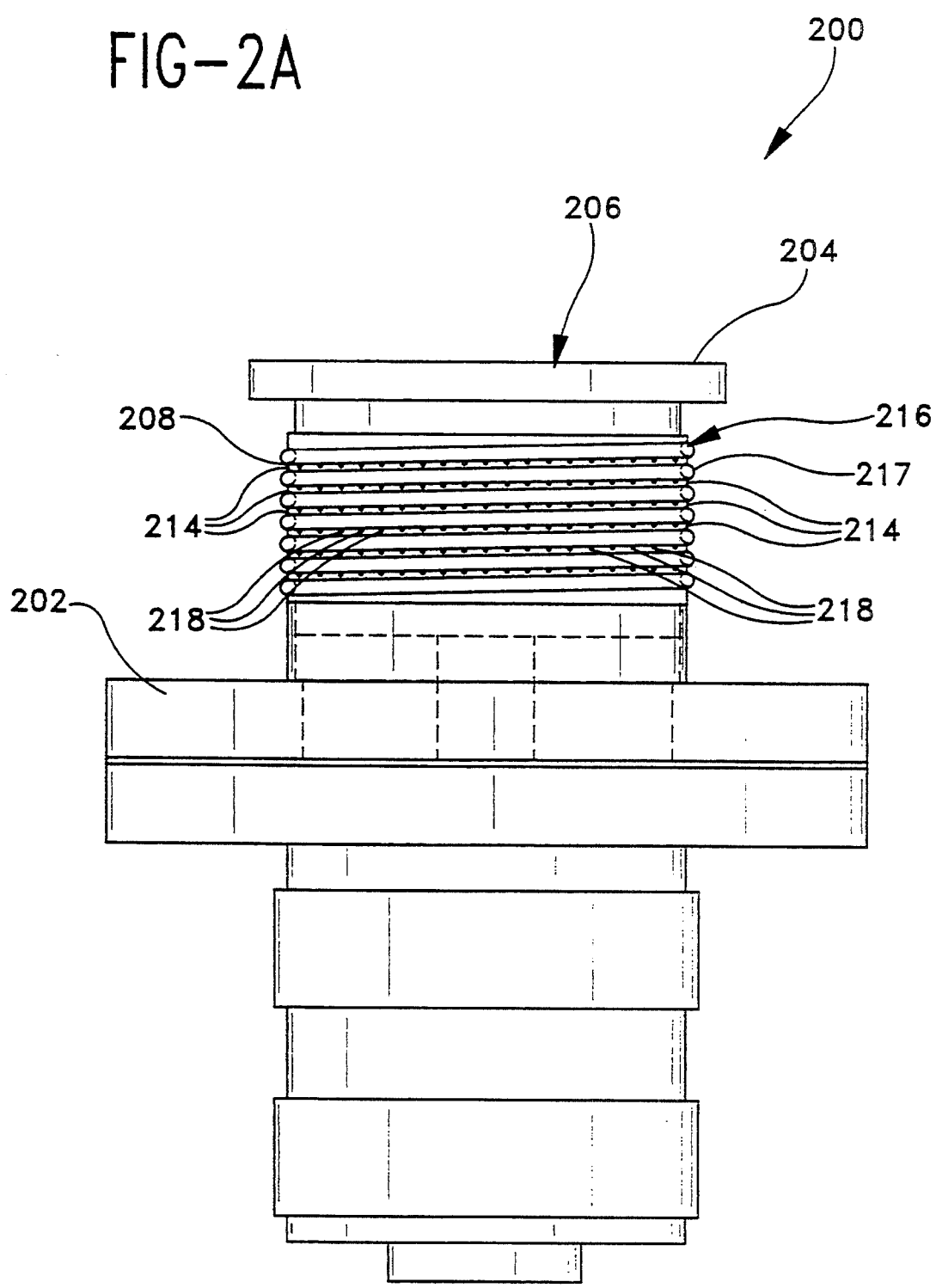

SPINNER HEAD FOR FLASH FLOW PROCESSING

BACKGROUND OF THE INVENTION

The present invention relates to flash flow processing, and more particularly relates to a spinner head for flash flow processing.

Various spinning machines have been designed for spinning molten materials, particularly sugar. The materials may be introduced to a spinning assembly in molten form or, alternatively, introduced in solid form and melted or subjected to flash flow just prior to being spun out from the spinning assembly.

U.S. Pat. No. 4,872,821 discloses a spinning machine which is particularly designed for spinning cotton candy. The machine includes a spinner head having slotted cylindrical walls and heating elements adjacent each wall. Sugar in solid form is introduced into the spinner head and propelled against heating elements where it is melted (i.e., undergoes flash flow transition) and caused to travel through a tortuous path. The molten sugar is spun out through the slots where it solidifies into the floss-like material known as cotton candy.

Various other machines have been designed over the years for spinning cotton candy. One such machine is disclosed in the U.S. Pat. No. 3,930,043. This machine includes a helical heating element positioned within a finely perforated shell. The heating element is supported against the inner wall of the shell by spacer elements. As the shell spins, molten sugar is extruded through the perforations. Similar machines are disclosed in U.S. Pat. Nos. 3,073,262 and 3,070,045.

U.S. Pat. No. 3,856,443 discloses another type of spinning machine wherein the perforated shell through which sugar is extruded functions as the resistance element of the heating means.

U.S. Pat. No. 1,541,378 discloses a spinning machine including a heating ribbon positioned within a helically wound wire. The heating ribbon melts the sugar, which then passes through interstices thereof and then between the coils of the helically wound wire.

Finally, U.S. Pat. No. 816,055 discloses a spinning machine including a pair of inner and outer heating elements positioned on opposite sides of a perforated shell. The outer heater element is maintained at a low heat setting relative to the inner.

The art relating to spinning machines is generally directed to machines for making cotton candy. Sugar is introduced into a spinner head, and is ordinarily caused to travel through a rather tortuous path where it is converted to a molten state. The molten material is spun out of the head, and solidifies into a floss-like material. The material is then collected in a basin or basket surrounding the spinner head.

While much of the existing machinery probably performs satisfactorily for converting granular sugar into a floss-like material, is not entirely satisfactory for spinning other materials which may have properties quite similar to sugar, or which tend to be more adversely affected by heat than sugar. In recent years, it has been increasingly desirable to spin not only sugar and materials combined with sugar, but also non-saccharides.

One recently developed method of producing substances having pharmacological properties is disclosed in U.S. Pat. No. 4,855,326. The patent discloses combining sugar with a medicament and spinning the combination into a readily water-soluble floss or fiber. In U.S. Pat. No. 5,011,532, the disclosure concerns oleaginous substances such as vegetable oil, baby oil, margarine, lanolin, Cocoa butter and the like, and how the lack of affinity for water of these substances is altered by mixing the oleaginous substance with sugar and melt-spinning the mixture in cotton candy spinning machines or the equivalent. As so modified, the products disperse in water forming a colloidal or a pseudocolloidal dispersion.

Other disclosures which relate to spinning substances with one or more sugars are found in U.S. Pat. No. 4,873,085, issued Oct. 10, 1989, U.S. Pat. No. 5,034,421, issued Jul. 30, 1991, U.S. Pat. No. 5,028,632, issued Jul. 2, 1991, and U.S. Pat. No. 4,997,856, issued Mar. 5, 1991. All of the above-cited patents are specifically incorporated herein by reference. The products described in the above-mentioned patents are all produced by processing in a cotton candy machine. Illustrative of the cotton candy machine is the Econo Floss Model 3017 manufactured by Gold Medal Products Company of Cincinnati, Ohio. The processes described in the above-identified disclosures involve the use of sugar (s) as a feedstock material which is spun to produce a material such as a floss, fiber, etc.

The use of non-saccharide polymers as biodegradable carriers for various active agents has recently been proposed. Such carriers are spun with the active agents to produce a solid capable of releasing the active agent over time within the body of a patient. Flash flow processing non-saccharide polymers, however, at times requires greater heat control during the flash flow process than normally required for processing sugars. Product quality is under certain circumstances contingent upon maintaining the temperature within a finite temperature range.

Even in view of the various conventional machinery discussed above, a need still exists for a spinner head for flash flow processing capable of providing substantially even heat distribution at the flash flow surface. It would therefore be advantageous to have an apparatus to provide for evenly distributed heat at the flash flow surface. If the heat distribution at the flash flow surface is even, the temperature thereat may be more easily controlled ensuring a greater consistency to the end product formed from the material subjected to flash flow conditions. It also would be advantageous to have an apparatus wherein the flash flow material contacts the heated flash flow surface within the spinner head for a minimal time. A more direct route of travel by the flash flow material through the spinner head wall would ensure less physical contact to the heating source. Concommitantely, less burning and product inconsistency would be realized.

It is therefore an object of this invention to provide a spinner head for flash flow processing in which a heating element provides continuous uniform heat to a flash flow surface of the spinner head.

It is another object of this invention to provide a spinner head for flash flow processing whereby the amount of time in which flash flow material is subjected to heating is at a minimum.

It is still another object of this invention to provide a spinner head for flash flow processing in which a flash flow surface for contacting the flash flow material is substantially flat and smooth.

It is yet still another object of this invention to provide a spinner head for flash flow processing in which flash flow material is projected out of the head through a substantially non-tortuous path.

SUMMARY OF THE INVENTION

The present invention is a unique spinner head for flash flow processing which includes a heating element affixed to a substantially continuous wall of the spinner head such that substantially continuous and uniform heat is provided to an inner surface of the wall. Flash flow material subjected to the continuous uniform heat at the inner surface of the wall undergoes flash flow transition and is then projected through any of a plurality of openings through the wall which have non-tortuous paths of exit.

In accordance with the preferred embodiment of this invention, a spinner head for flash flow processing includes a spinner head having a closed base and a top with an opening for introducing feedstock to the head. For purpose of explanation and disclosure of preferred mode, the axis of rotation is disclosed herein as vertical, but the axis of rotation can be at any angle selected by the artisan, so that the closed base and top can be arranged spatially in any position. For example, the base and top can be oriented so that the axis of rotation is horizontal rather than vertical. The spinner head also includes a wall having an inner surface and an outer surface that extends between the base and the top to provide a chamber for flash flow processing. The outer surface of the wall is provided with relief to accommodate fixation of an external heating element for the uniform supply of surface heat to the inner wall surface whereby flash heat conditions are induced in feedstock contacting the inner wall surface there. The wall further includes a plurality of openings extending through the wall from the inner to outer surface, each of which forms a substantially non-tortuous path for passage of flash heat-treated product therethrough and unimpeded just beyond said openings. Preferably, the wall is substantially cylindrical.

The relief preferably defines a substantially continuous helical protrusion forming an open-ribbed helix about the outer surface of the wall such that a channel is formed between ribs of the helix which accommodates the fixation of the heating element. In another form, the relief may define a substantially continuous, serpentine, open-ribbed protrusion about the outer surface of the wall for accommodating fixation of the heating element. The channels are preferably concave in cross-section to define a concave surface sufficiently dimensioned to provide effective surface-to-surface contact with the heating element thereby maintaining the inner surface at a substantially uniform temperature.

The heating element may take the form of a helical coil with a substantially round cross-section, displaying a cylindrical outer surface. Such a heating element maximizes surface-to-surface contact with a circular concave surface of the channel. The contacting portion of the cylindrical outer surface is preferably equivalent to an arch length subtended by an angle of at least 10° measured at the center of the cross-section of the cylindrical helical coil.

Alternatively, the channel formed as a concave cross-section may take the form of a rectangular indentation. The heating element would then preferably be substantially rectangular in cross-section to assure good surface-to-surface contact. In each of the heating element designs, the heating elements should be positioned on the surface of the wall so that the wall openings are uniformly heated. Each opening forming each non-tortuous path is preferably incorporated within the ribs such that each path extends through the wall providing communication between the inner and outer wall surfaces.

The present invention also includes a flash flow process in which a feedstock capable of undergoing flash flow processing is subjected to heat and shear force in a spinner head having a closed base and a top and a wall, preferably cylindrical, extending between the base and the top to provide a chamber for flash flow processing. The wall has an inner surface and an outer surface. The outer surface is formed with relief to accommodate the fixation of a heating element to provide uniform heat to the inner surface. The uniform heat induces flash flow transition in the feedstock. The wall further includes a plurality of openings extending from the inner to outer surface, each of which forms a substantially non-tortuous path for the passage of flash heat-treated product therethrough.

Preferably, the process includes providing flash heat by energizing the heating element. Shear force is provided by causing the spinner head to rotate about an axis such that feedstock is propelled against the inner surface. The feedstock propelled against the inner surface is subjected to flash heat thereat and passed through the openings.

As a result of the present invention, a spinner head for flash flow processing is now available that is capable of providing substantially uniform heat to a flash flow surface. The substantially uniform heat ensures consistent flash flow transition at the flash flow surface and therefore a more consistent and higher quality spun product. In addition to providing consistent flash flow conditions pursuant to the even heating provided by this invention, the substantially non-tortuous path traveled by the feedstock minimizes resistance to its outflow. Minimizing resistance to the flow product minimizes the time the product is exposed to the flash flow heat. The combined effect of more consistent heat distribution at the flash flow surface and the less tortuous route by which the product melt must travel, provides a significantly improved control of the flash flow procedure.

The invention will be better understood in light of the following description of the preferred embodiments.

BRIEF DESCRIPTION OF THE DRAWINGS

FIG. 2A is a side elevational view of a spinner head assembly of the invention shown with a heating element affixed;

DETAILED DESCRIPTION OF THE PREFERRED EMBODIMENTS

The spinner head of this invention is unique in its ability to provide evenly distributed heat at a flash flow heating surface on an inside cylindrical wall of the spinner head. The evenly distributed heat induces flash flow conditions thereat as feedstock material is spun out into contact with the inner wall and permitted to pass through a plurality of non-tortuous openings extending from the inner wall surface to the outer wall.

Flash flow is referred to in the present invention as a phenomenon which occurs when a solid carrier material (feedstock) is subjected to conditions of temperature and shear sufficient to provide internal flow at a subparticle level. This condition produces a transformation of physical and/or chemical structure without degradation of the material. Internal flow occurs when the infrastructure of the material breaks down sufficiently to permit movement of the material at a subparticle level and probably at a molecular level. At a molecular level, internal flow contemplates the movement of molecules relative to each other.

"Flash flow" phenomenon of the present invention occurs when materials are "flash-heated" which is defined as exposing the materials to heat for very short periods of time, not more than one second, preferably on the order of tenths of a second, and most preferably on the order of milliseconds. This unique phenomenon can be produced by relatively high speed distribution of the feedstock material to an environment of elevated temperature under a constant force, such as centrifugal force, caused by high speed rotation of the spinner head. See U.S. Pat. No. 4,855,326, issued Aug. 8, 1989, U.S. patent application Ser. No. 07/881,603 filed May 12, 1992, now U.S. Pat. No. 5,279,849, U.S. patent application Ser. No. 07/847,595 filed Mar. 5, 1992, now U.S. Pat. No. 5,387,431, international application PCT/US92/04053 filed May 13, 1992, and U.S. patent application Ser. No. 07/893,238, filed Jun. 3, 1992, all of which are incorporated herein by reference.

In the present invention, feedstock material is subjected to flash flow sufficiently to deform and pass through an opening under a minimum amount of force. The force by the preferred embodiment is centrifugal force provided by a spinning head from which the heat-treated feedstock material is thrown at high speed. No external force other than air resistance is imposed on the flowable feedstock material (product) after it is flung out of the spinner head. The heat-treated product quickly reforms as a solid having altered physical and/or chemical structure. The altered product structure results from the forces acting on the material as it exits the head and is hurled outwardly for the period during which it experiences flash flow.

Figure 1:
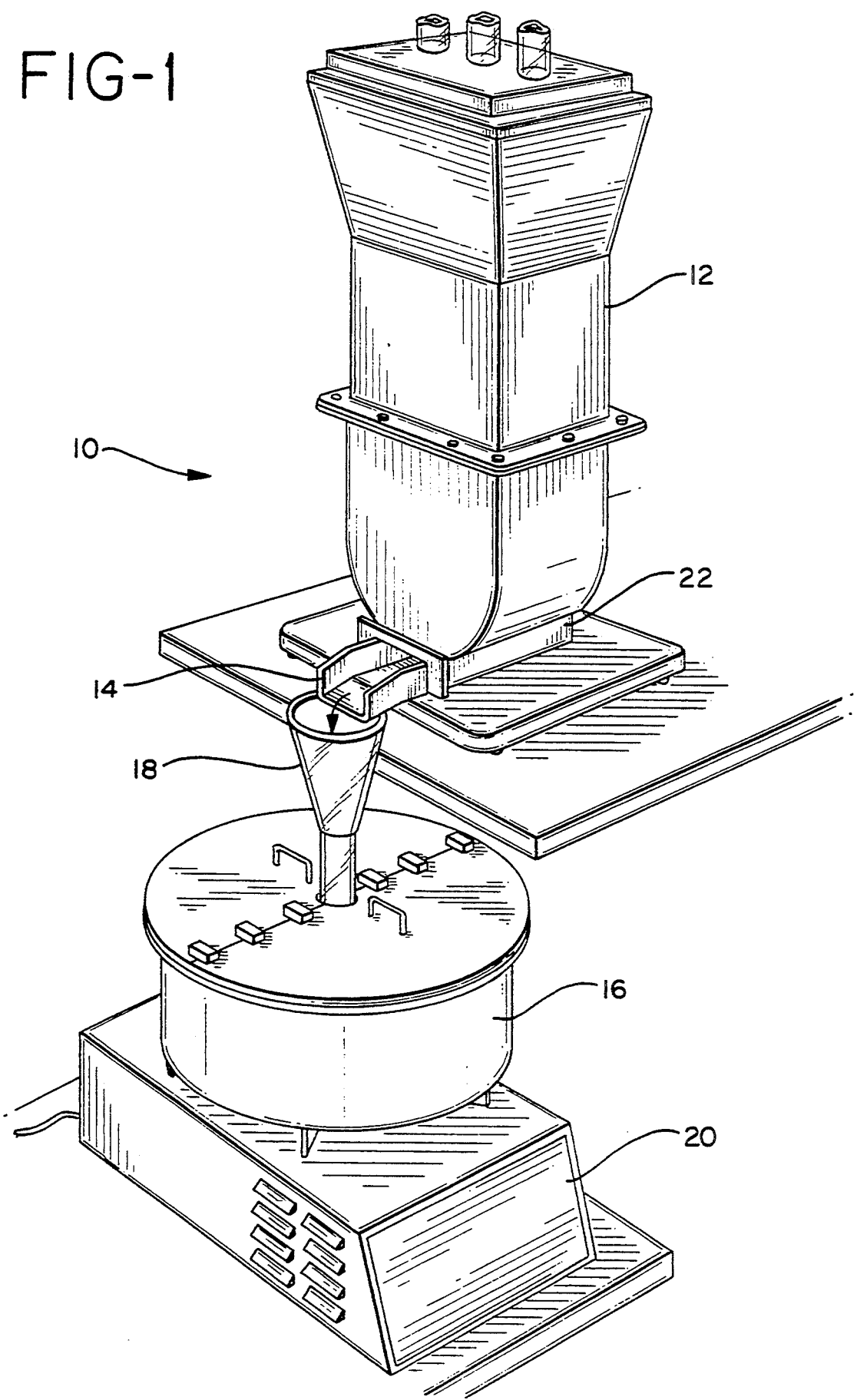
FIG. 1 is a perspective view of an assembly for processing thermo-flow materials in accordance with the present invention.

Referring now to the drawings, FIG. 1 shows an assembly 10 for feeding the thermo-flow materials to a spinner head where they may be subjected to a flash flow process and collected in a basin or basket. The assembly includes a hopper 12, a chute 14, a basin 16, a spinner head (not shown) positioned within the basin 16, a funnel 18 for directing feedstock material from the chute 14 to the spinner head, and a base 20. The base includes a motor (not shown) for driving the spinner head in a known manner as described in U.S. Pat. No. 4,872,821, which is incorporated herein by reference, which has been converted to a variable speed drive system. A feeder assembly 22 is positioned at the base of the hopper, the chute 14 extending therefrom. The feeder assembly may include a screw-type feeder or the like, for moving feedstock material from the hopper to the funnel 18.

Figure 2B:
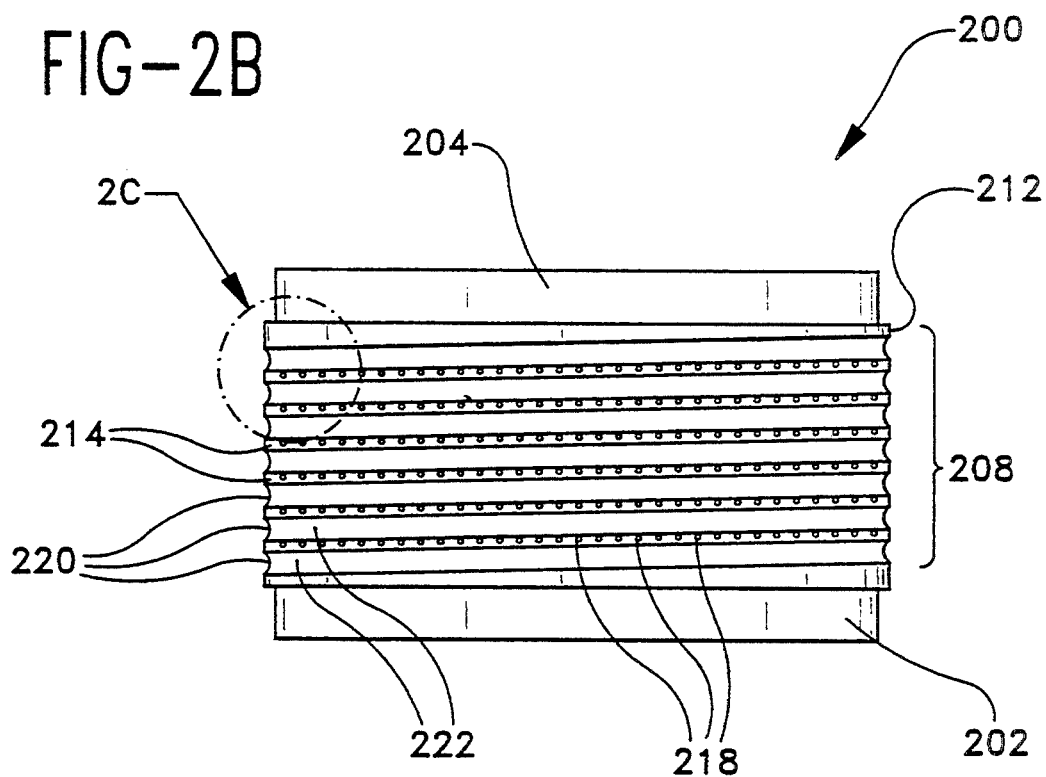
FIG. 2B is a side elevational view of the spinner head shown in FIG. 2A with the heating element removed.
Figure 2C:
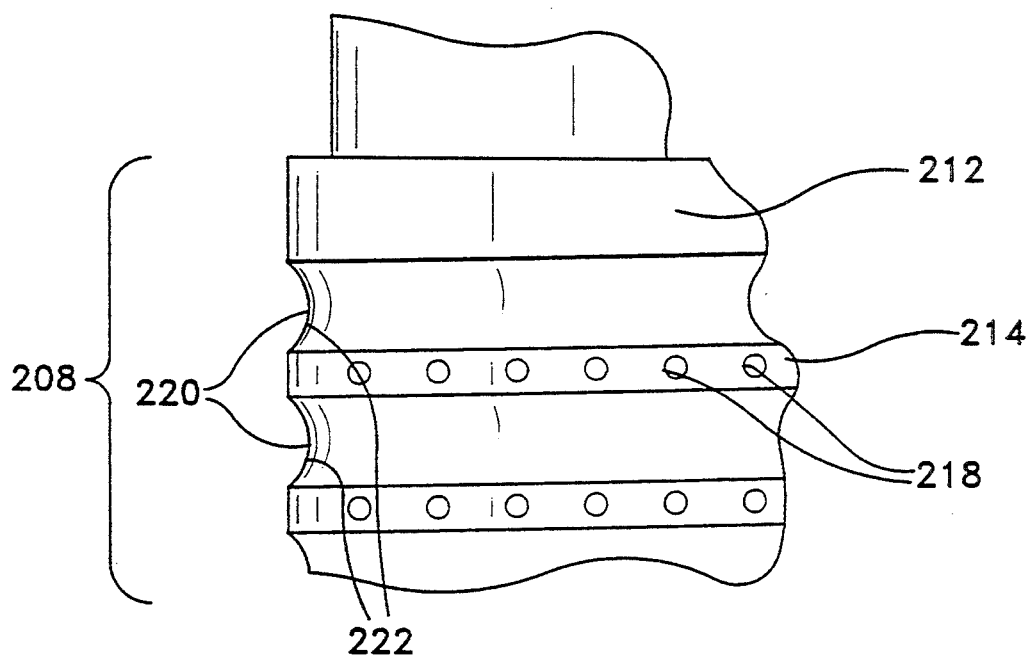
FIG. 2C is an enlarged side sectional view of a detailed portion of the spinner head of FIG. 2B.

The preferred embodiment of a spinner head for flash flow processing of this invention will now be described. A spinner head 200 is shown in FIG. 2A to include a closed base 202 and a top 204 having an opening 206 for introducing feedstock to the spinner head. The spinner head also includes a substantially cylindrical wall 208 having an inner surface 210 (FIG. 2D and 2E) and an outer surface 212 (FIGS. 2B and 2C). The substantially cylindrical wall extends between the base and the top to provide a chamber for flash flow processing. The outer surface 212 is provided with relief 214 formed to accommodate the fixation of a heating element 216 to provide uniform surface heat to inner surface 210.

The relief 214 defines a substantially continuous helical protrusion forming an open-ribbed helix about outer surface 212. A channel 220 (FIGS. 2B–2F), having a substantially concave cross-section, is formed between each rib (protrusion) 214. The heating element 216 is imbedded within the wall 208 substantially contacting the concave cross-sectional surface of the wall. The contour of concave surface 222 allows seating which ensures effective surface-to-surface contact with an outer cylindrical surface of heating element 216. The more effective concave surface 222/heating element 216 contact show a marked improvement in heat transfer characteristics over conventional spinner heads. A uniform supply of surface heat by this invention to inner wall surface 210 results from the improved heat transferability, ensuring that flash heat conditions are uniformly induced in feedstock contacting the inner surface. Uniform flash heat conditions result in improved control of the flash flow process and, consequently, an improved flash flow product.

FIG. 2B shows a side elevational view of the embodiment of this invention shown in FIG. 2A, and FIG. 2C shows a detailed portion of the view of FIG. 2B. FIGS. 2B and 2C clearly show relief (ribs) 214 formed as a substantially continuous helical protrusion taking on the appearance of an open-ribbed helix about outer surface 212. Channel 220 formed between the helical ribs accommodates fixation of heating element 216 as shown in FIG. 2A. The figures show a plurality of openings 218 extending through the wall from the inner surface 210 to outer surface 212, forming non-tortuous paths for passage of the heat-treated product. The plurality of openings 218 are located through the ribs 214 between the coils of heating element 216.

In one embodiment, the diameter of openings 218 is 0.020 inches, plus or minus 0.004 inches, and the distance between openings is 0.100 inch. While these stated dimensions define one embodiment of the spinner head of this invention, their inclusion is exemplary and not intended as a limitation. The openings may be formed by any means, e.g., by laser, drilling, etc. They may be cone-shaped in cross-section relative to the inner and outer wall surfaces. See 418 and 518 in FIGS. 2H and 2I. The openings may also have a central constriction 319' as shown in FIG. 2G for particular applications.

Figure 2D:
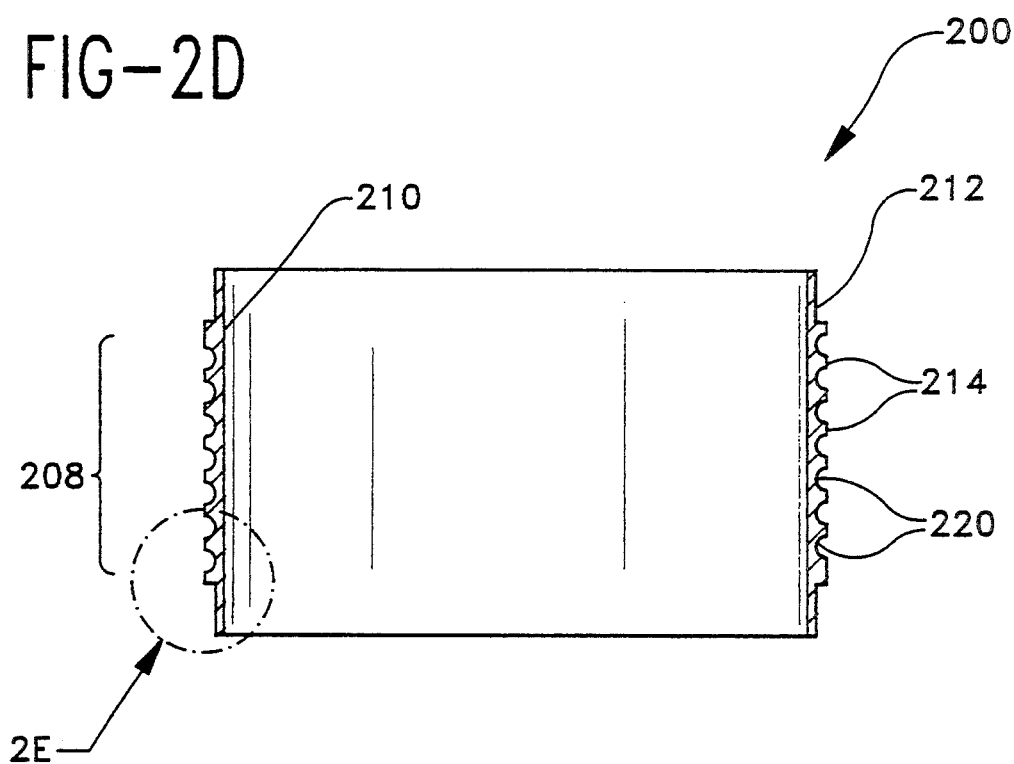
FIG. 2D is a cross-sectional view of the spinner head shown in FIG. 2B.
Figure 2E:
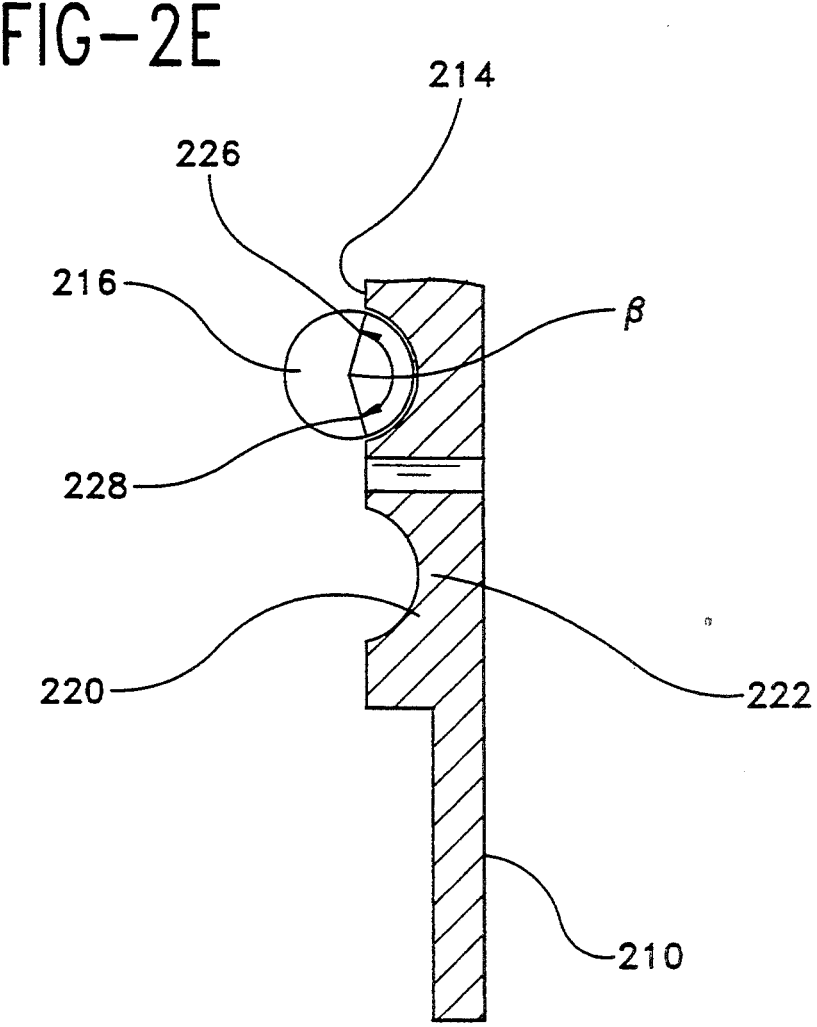
FIG. 2E is an enlarged cross-sectional view of a detailed portion of the spinner head shown in FIG. 2D with a section of a heating element shown schematically.

FIG. 2D shows a cross-sectional view of the spinner head shown in FIG. 2A without the heating element. FIG. 2E is a detail of one portion of cylindrical wall 208 identified as 2E in FIG. 2D. FIG. 2E shows a portion of helical coil 216 affixed in channel 220 of outer cylindrical surface 212. The coil is in surface-to-surface contact with concave surface 222. An angle $\beta$ subtends the contacting portion of the cylindrical outer surface of coil 216. The contacting portion is equal to an arc length defined by angle $\beta$. Angle $\beta$ is defined by rays 226 and 228 extending from the cylindrical center of a cross-section of helical coil 216. The amount of contacting surface of coil 216 is dependent on the circumference of concave channel 220.

It is believed that intimate continuous contact between the surface of a heating element and the outside surface of the spinning head results in efficient heating of the interior surface of the spinning head.

Each opening 218 of the plurality of openings positioned on the ribs 214 forms a non-tortuous path extending through the substantially cylindrical wall. The openings thereby provide communication between the inner surface 210 and outer surface 212. Feedstock under flash flow conditions is propelled through the openings. As can be seen by FIG. 2E, inner surface 210 of cylindrical wall 208 can be smooth.

Figure 2F:
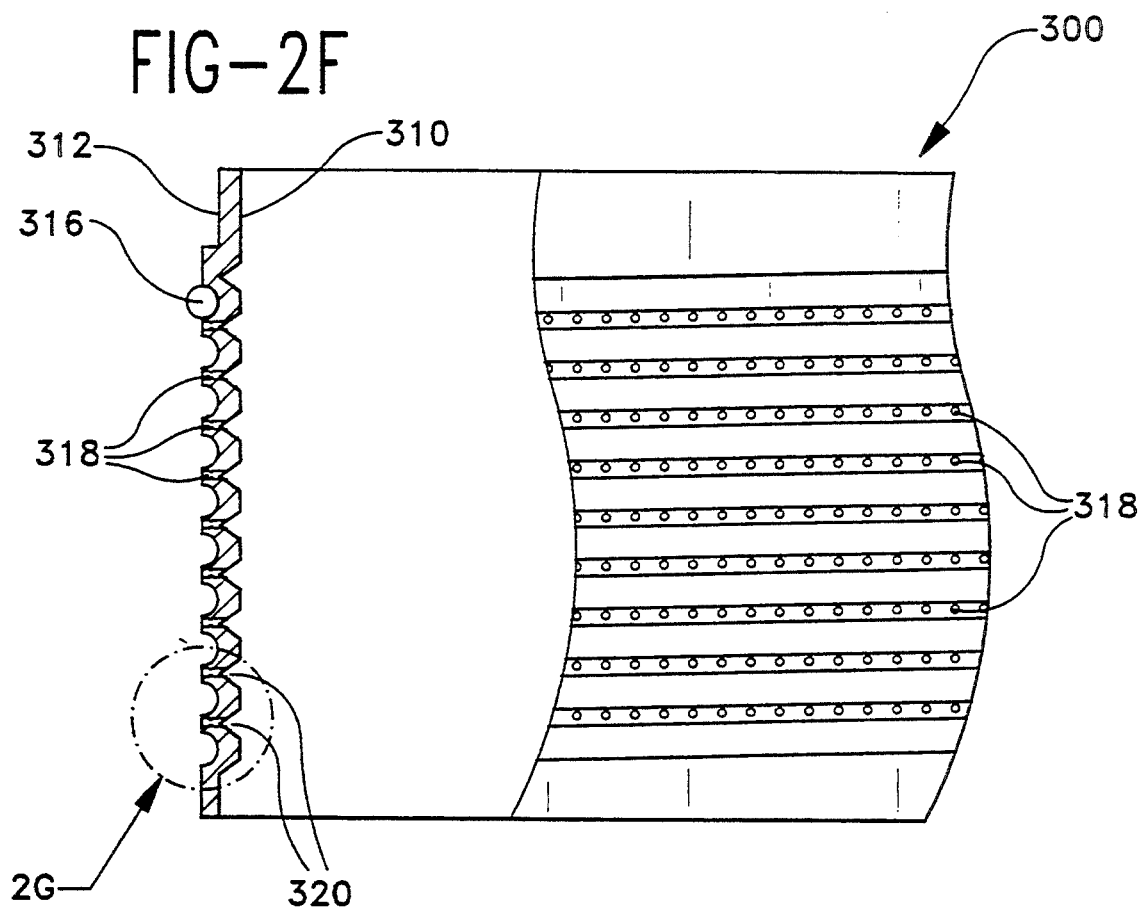
FIG. 2F is an enlarged portion of the wall of FIG. 2D depicting an alternative structure profile of one embodiment of the present invention.
Figure 2G:
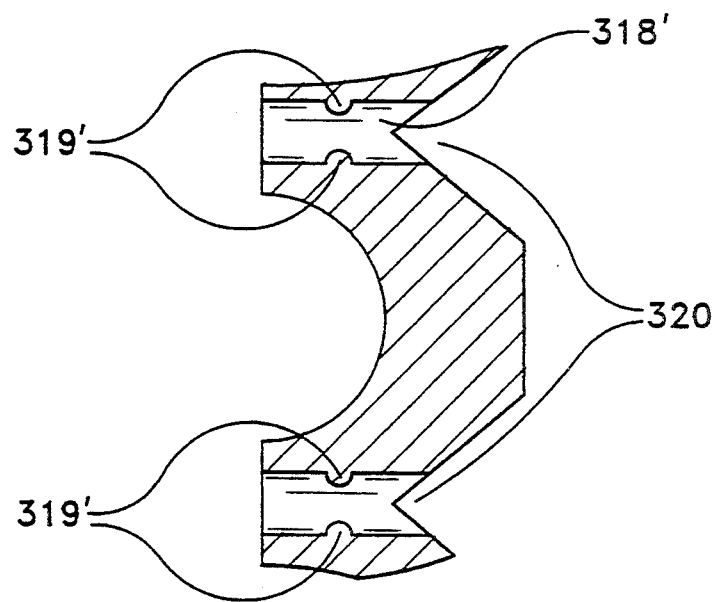
FIG. 2G is an enlarged cross-sectional view of an alternative detailed portion of FIG. 2F.

An alternative profile of the wall 208 is shown in FIG. 2F. There, a U-shaped or V-shaped groove or concavity 320 is shown opposite each orifice 318 on the inside of the spinner head 300. The structure predisposes heat-treated feedstock to flow into (and through) openings 318. In addition, the groove or concavity in the structure shortens the length of the path through openings 318.

FIG. 2G shows an alternative embodiment of the invention wherein the path formed through opening 318' includes a constriction 319'. The constrictions restricts the diameter of the flow path.

Figure 2H:
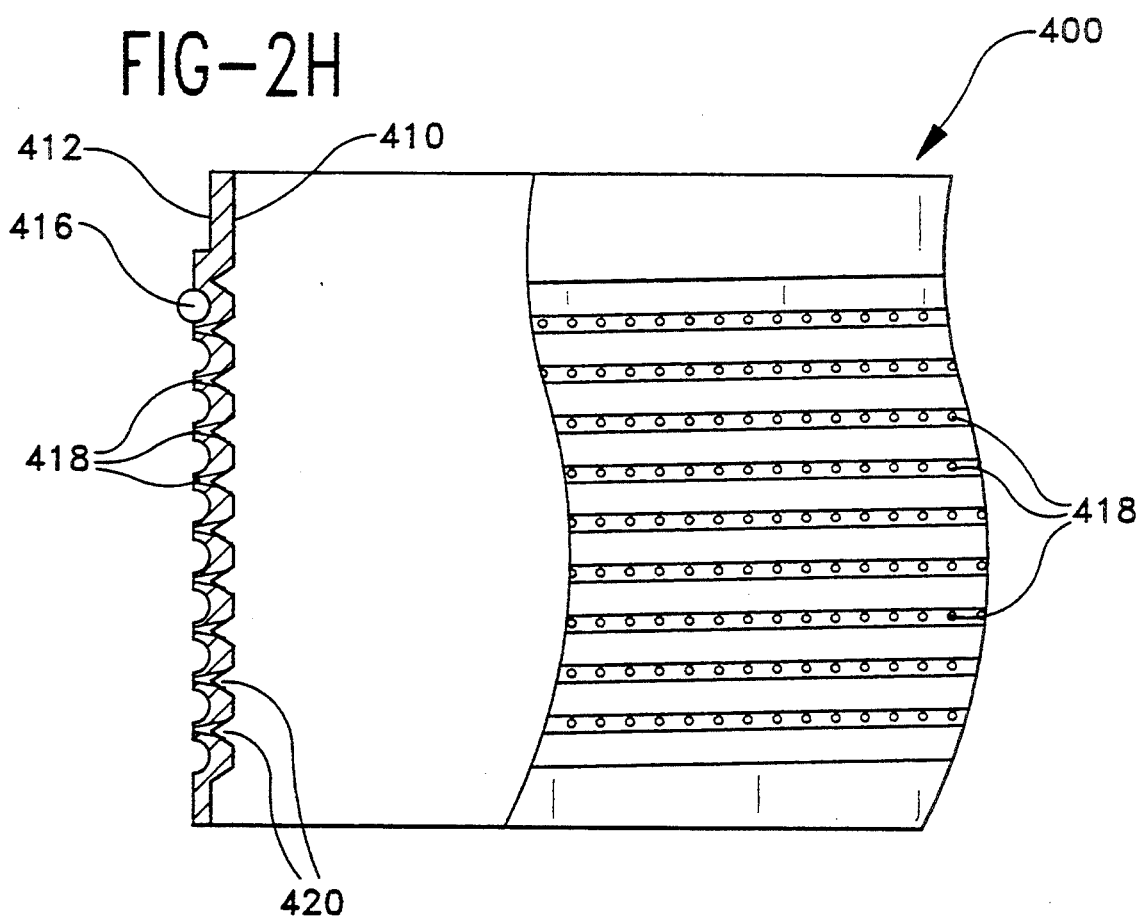
FIGS. 2H and 2I are additional alternative embodiments of the structure shown in FIG. 2F.
Figure 2I:
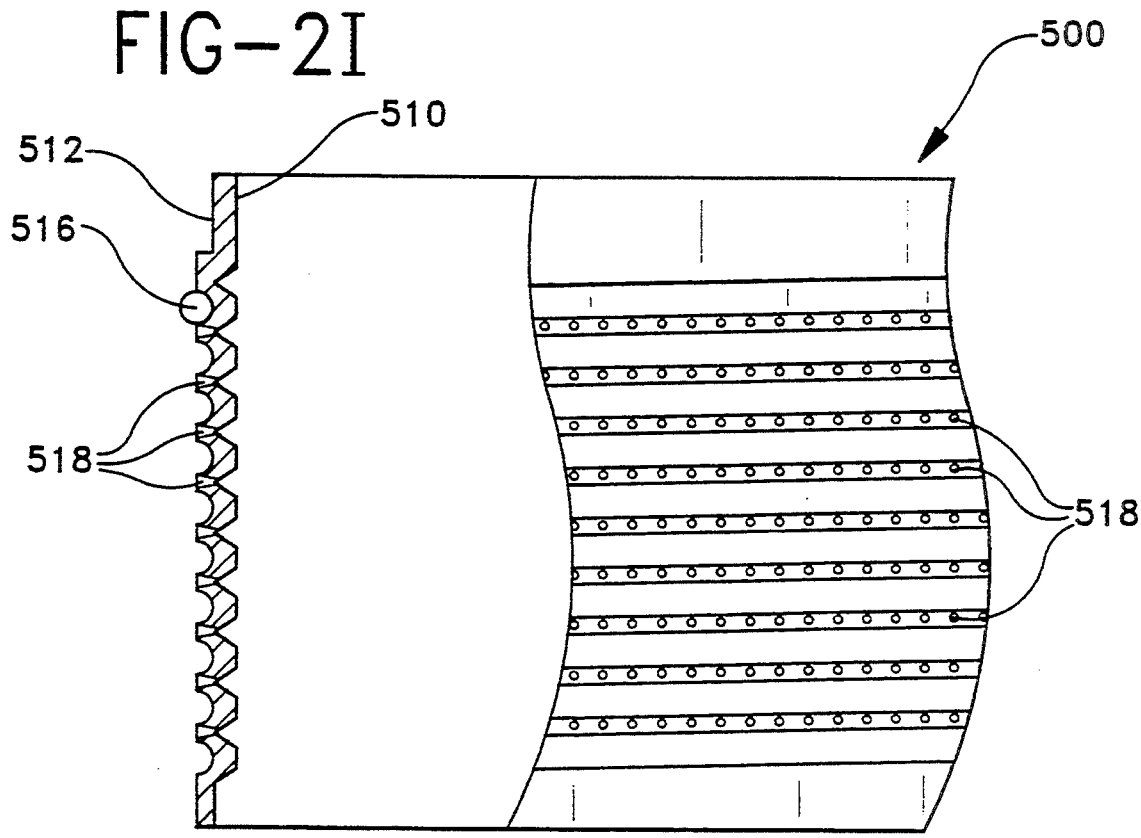

FIGS. 2H and 2I represent alternative embodiments of FIG. 2F, which highlight cone-shaped openings 418 and 518, respectively, forming the paths between the inner (410, 510) and the outer (412, 512) wall surfaces, respectively. In FIG. 2H, the diameter of the opening 418 at the inner surface 410 is larger than the diameter of the opening at the outer surface 412. In FIG. 2I, the diameter of the opening 518 at inner surface 510 is smaller than the diameter of the opening at outer surface 512.

Regardless of the dimension of the flow paths, affixing helical coil 216 to outer surface 212 (FIGS. 2A–2E) between ribs 214 prevents product passing through paths 218 from coming into contact with the helical coil. Because of this unique feature, the product passes unimpeded by the coil through the openings 218 to beyond the heating element 216. The combined features of uniform heating and dispersion via the non-tortuous path ensures feedstock contacts with the direct flash heat at inner surface 210 is minimal.

Figure 3:
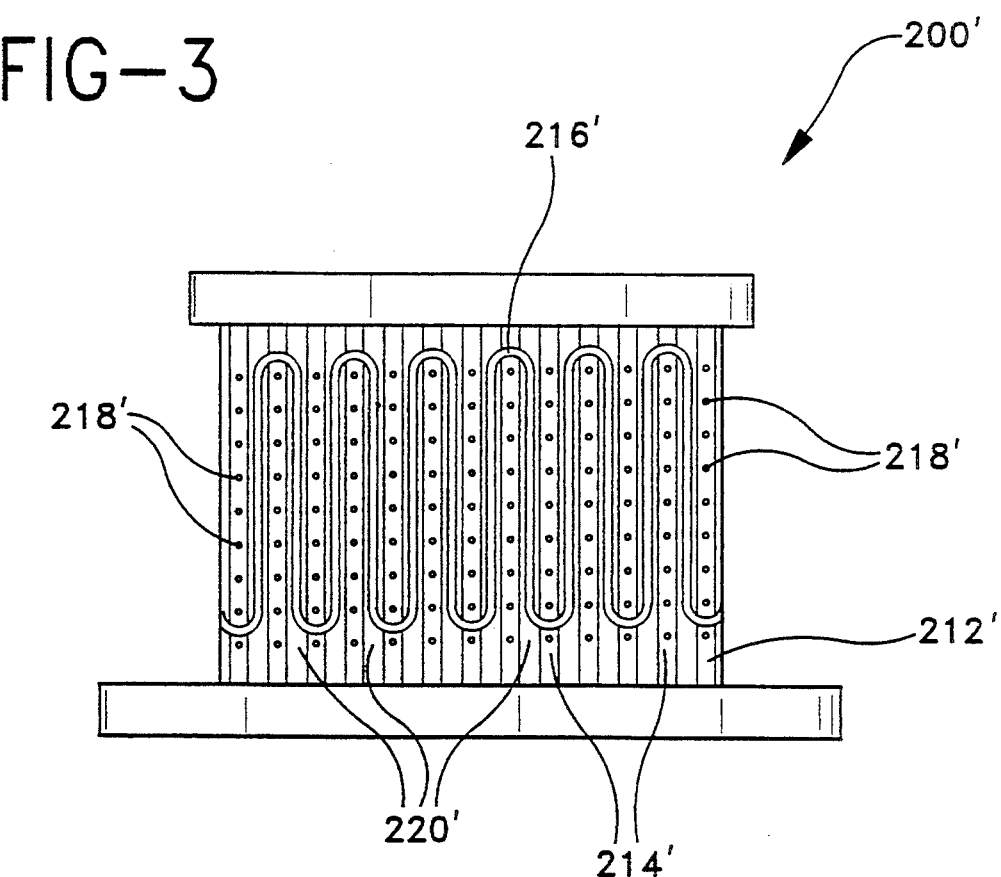
FIG. 3 is a side elevational view of another embodiment of the spinner head shown in FIG. 2A.
Figure 4:
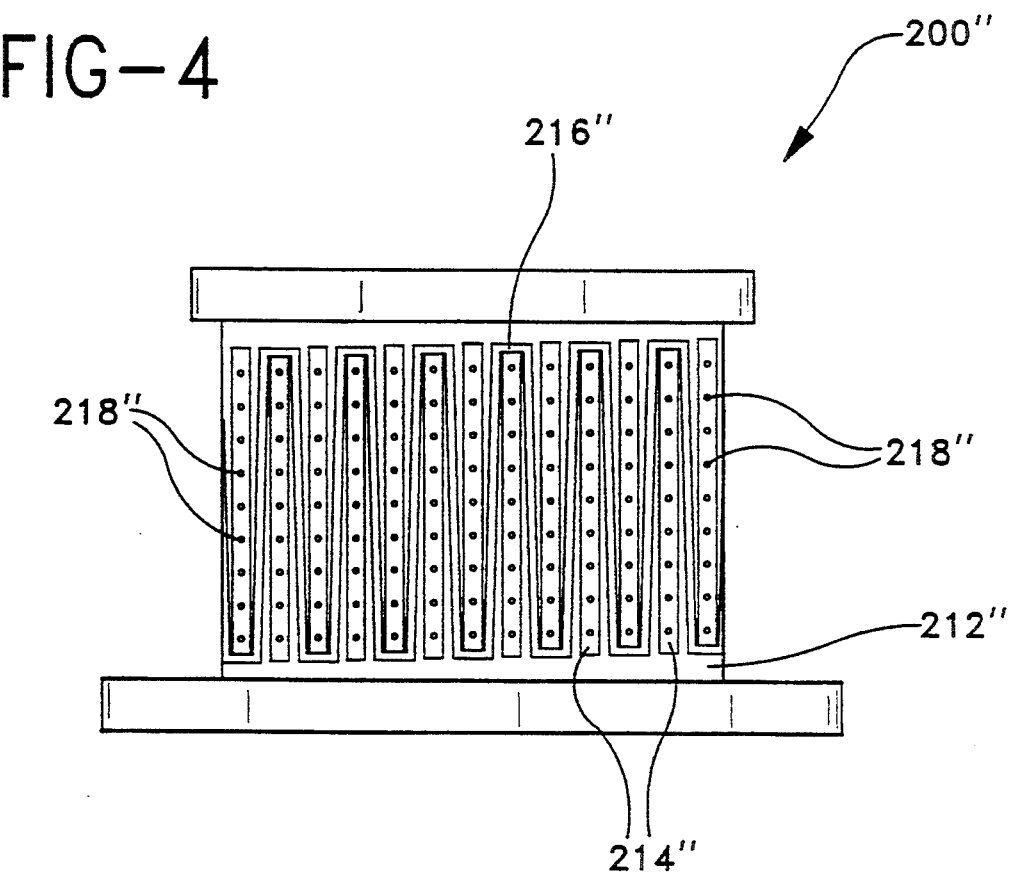
FIG. 4 is a side elevational view of yet another embodiment of the spinner head shown in FIG. 2A.

Referring now to FIGS. 3 and 4, alternative embodiments of spinner head 200 are shown. FIG. 3 shows relief 214' on outer surface 212' of the spinner head 200' provided to accommodate a substantially continuous serpentine heating element 216'. FIG. 4 shows a variation of spinner head 200'' wherein relief 214'' is formed to accommodate a substantially continuous triangular heating element 216''. The channels 220' and 220'' formed in the embodiments shown in FIGS. 3 and 4, respectively, may be cylindrically concave in cross-section to accommodate fixation therein of a substantially cylindrical serpentine or triangular shaped heating coil. However, any geometric shape which provides continuous surface contact between a heating element and the outside surface of a spinning head while permitted unimpeded flow is contemplated.

Each of the spinner heads 200' and 200'' depicted in FIGS. 3 and 4, show the relief 214' and 214'' in the form of ribs, adjacent the substantially serpentine (216') and triangular (216'') shaped heating elements, respectively. Openings 218' and 218'' provide substantially non-tortuous paths that permit the passage of feedstock through the wall from the inner to outer surfaces. The plurality of openings 218' and 218'' are positioned upon the ribs 214' and 214'' respectively The present invention also provides a process by which feedstock is subjected to flash flow conditions through the application of heat and shear force within a spinner head. The spinner head utilized by the method of this invention preferably includes a closed base and a top, and a wall extending between the base and the top forming a chamber for the flash flow processing. The wall includes an outer surface which is provided with relief to accommodate the fixation of a heating element for supplying uniform heat to an inner wall surface.

The process allows the product of flash flow condition to be projected through a plurality of openings extending through the wall from the inner to outer surfaces. The process of this invention is unique in that the feedstock is subjected to highly uniform flash heat and projected through substantially non-tortuous paths thereby forming a consistently high-grade product. The flash heat is provided by energizing the heating element, and shear force is provided by rotating the spinner head about an axis.

Thus, while there have been described what are presently believed to be preferred embodiments of the present invention, those skilled in the art will realize that other and further modifications and changes can be made without departing from the spirit of the invention, and it is intended to include all such changes and modifications as fall within the true scope of the invention as set forth in the following claims.

What is claimed is:

1. A spinner head for flash flow processing, said head comprising:
    a closed base;
    a top having an opening for introducing feedstock to said head; and
    a wall having an inner surface and an outer surface and extending between said closed base and said top to provide a chamber for flash flow processing, said outer surface provided with relief formed to accommodate fixation of an external heating element for the uniform supply of surface heat to said inner surface whereby flash heat conditions and shear are induced in feedstock contacting said inner surface, said wall further including a plurality of openings extending from said inner to said outer surface, each of said openings forming a substantially non-tortuous path for passage of product therethrough and unimpeded just beyond said openings.

2. The spinner head as defined by claim 1, wherein said wall is cylindrical, wherein said relief defines a substantially continuous helical protrusion forming an open-ribbed helix about said outer surface, and wherein a channel formed between ribs of said helix accommodates fixation of said heating element.

3. The spinner head as defined by claim 1, wherein said relief defines a substantially continuous serpentine open-ribbed protrusion about said outer surface, and wherein a channel formed between ribs of said open-ribbed protrusion accommodates fixation of said heating element.

4. The spinner head as defined by claim 2, wherein said channel is at least generally concave in cross-section defining a concave surface of sufficient dimension to provide effective surface-to-surface contact with said heating element which at least generally conforms to said concave surfaces, whereby said inner surface is maintained at a substantially uniform surface temperature.

5. The spinner head as defined by claim 4, wherein said heating element is a helical coil having a substantially round cross-section with a cylindrical outer surface whereby said surface-to-surface contact with said concave surface is maintained.

6. The spinner head as defined by claim 5, wherein a contacting portion of said cylindrical outer surface is defined by an arc length subtended by an angle of at least a ten degrees (10°) measured at the cylindrical center of said helical coil.

7. The spinner head as defined by claim 3, wherein said channel is a rectangular indentation and said heating element is substantially rectangular in cross-section.

8. The spinner head as defined by claim 1, wherein said inner surface of said wall is smooth.

9. The spinner head of claim 1, wherein said inner wall surface includes one of a groove and concavity which extends from each of said plurality of openings.

10. The spinner head as defined by claim 2, wherein each opening of said plurality of openings forming each non-tortuous path is located axially upon said ribs thereby providing communication between said inner and said outer wall surfaces.

11. The spinner head as defined by claim 10, wherein said heating element is affixed to said wall in continuous surface-to-surface contact with a concave surface of said channel.

12. The spinner head as defined by claim 10, wherein each of said plurality of openings forming said paths are cone-shaped and wherein a diameter of each opening at said inner wall surface is larger than a diameter of the opening at said outer wall surface.

13. The spinner head as defined by claim 10, wherein each of said plurality of openings forming said paths are cone-shaped and wherein a diameter of each opening at said inner wall surface is smaller than a diameter of the opening at said outer wall surface.

14. The spinner head as defined by claim 10, wherein each of said plurality of openings includes a constricting member positioned substantially midway along said path between said outer and inner wall surfaces.

15. A flash flow process, comprising:
subjecting a feedstock capable of undergoing flash flow processing to heat and shear force in a spinner head having a closed base and a top and a wall extending between said base and said top to provide a chamber for flash flow processing, said wall having an inner surface and an outer surface, said outer surface provided with relief to accommodate the fixation of an external heating element for providing uniform heat to said inner surface whereby flash heat is induced in said feedstock, said wall further including a plurality of openings extending through said wall from said inner to said outer surface, each of said openings forming a substantially non-tortuous path for the passage of product therethrough at said openings unimpeded just beyond said heating element.

16. The process as defined by claim 15, wherein flash heat is provided by energizing said heating element, and shear force is provided by causing said spinner head to rotate about an axis such that feedstock is propelled against said inner surface whereby it is subjected to said flash heat and passed through said openings.

17. The process as defined by claim 15, wherein said relief comprises a substantially continuous helical protrusion forming an open-ribbed helix about said outer surface and wherein a channel is formed between ribs of said helix.

18. The process as defined by claim 17, wherein each opening of said plurality of openings is located axially through said ribs and through said wall from the inner surface to the outer surface.

19. The process as defined by claim 17, wherein each channel is at least generally concave in cross-section defining a concave surface of sufficient dimension to provide effective surface-to-surface contact with said heating element whereby said inner surface is maintained at a substantially uniform temperature.

20. The process as defined by claim 19, wherein said heating element is helical and has a substantially round cross-section whereby said surface-to-surface contact with said concave surface is maintained.

21. The process as defined by claim 20, wherein a contacting portion of an outer surface of said heating element is defined by an arc length subtended by an angle of at least a ten degrees (10°) measured from the cylindrical center of said heating element cross-section.

* * * * *